(12) United States Patent
Larson et al.

(10) Patent No.: US 7,401,956 B2
(45) Date of Patent: Jul. 22, 2008

(54) TRIM AND LAMP OR LAMP CLUSTER FOR MOTOR VEHICLE

(75) Inventors: Grant Larson, Ludwigsburg (DE); Manfred Wuerfel, Leonberg (DE); Stefan Eberhardt, Backnang (DE); Oliver Peters, Wiernsheim (DE); Stef Scheepers, Moensheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 189 days.

(21) Appl. No.: 11/060,491

(22) Filed: Feb. 18, 2005

(65) Prior Publication Data

US 2005/0207167 A1    Sep. 22, 2005

(30) Foreign Application Priority Data

Mar. 20, 2004    (DE)  .................. 10 2004 013 775

(51) Int. Cl.
*B60Q 1/00*    (2006.01)
(52) U.S. Cl. .................. 362/496; 362/502; 362/543; 362/544
(58) Field of Classification Search ......... 362/505–507, 362/502, 500, 516–519, 545, 547, 540, 543–544
See application file for complete search history.

(56) References Cited

U.S. PATENT DOCUMENTS 2,196,915 A    4/1940   González

| 4,733,335 | A  | * | 3/1988  | Serizawa et al. ............ 362/503 |
| 5,362,102 | A  | * | 11/1994 | Hajek et al. .................. 280/751 |
| 6,382,819 | B1 | * | 5/2002  | McQuiston .................. 362/495 |
| 6,974,238 | B2 | * | 12/2005 | Sturt et al. .................. 362/488 |
| 7,182,398 | B2 | * | 2/2007  | Lin .......................... 296/193.1 |

FOREIGN PATENT DOCUMENTS

| DE | 33 38 466 C2 | 1/1987  |
| DE | 3815646      | 11/1989 |
| DE | 19836526     | 2/2000  |
| DE | 29824069 U   | 8/2000  |
| DE | 10337617     | 3/2005  |
| DE | 10337615     | 4/2005  |
| DE | 10340723     | 4/2005  |
| JP | 2001-105966  | 4/2001  |

OTHER PUBLICATIONS

German Office Action dated Feb. 1, 2005, with English translation.

* cited by examiner

*Primary Examiner*—Jong-Suk (James) Lee
*Assistant Examiner*—Robert May
(74) *Attorney, Agent, or Firm*—Crowell & Moring LLP

(57) ABSTRACT

A motor vehicle, in particular an automobile, has a trim that constitutes an end section of the motor vehicle on which at least one cooling air opening and one lamp or one lamp cluster are provided. At least one elongated fin is arranged on the at least one cooling air opening. In order to omit additional valves in a kit for installation of the lamp or lamp cluster, the lamp or lamp cluster is arranged within the at least one cooling air opening and is mounted on a fin that extends within the cooling air opening.

19 Claims, 4 Drawing Sheets

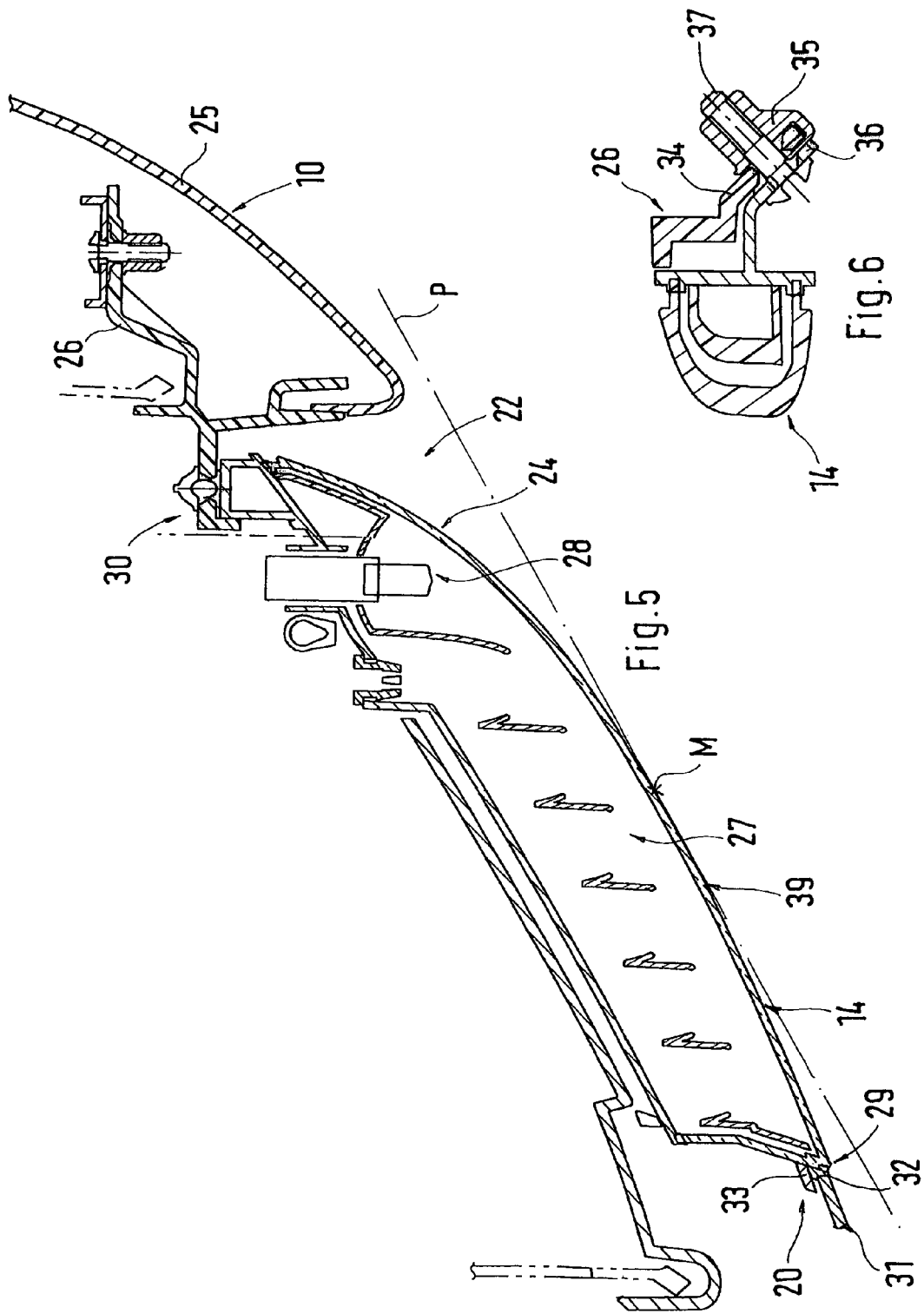

TRIM AND LAMP OR LAMP CLUSTER FOR MOTOR VEHICLE

This application claims the priority of German application 10 2004 013 775.7, filed Mar. 20, 2004, the disclosure of which is expressly incorporated by reference herein.

BACKGROUND AND SUMMARY OF THE INVENTION

This invention concerns a motor vehicle, in particular an automobile, having a trim that constitutes an end section of the motor vehicle, on which at least one cooling air opening and one lamp or one lamp cluster are provided, and in which at least one elongated fin is arranged on the at least one cooling air opening.

German document DE 33 38 466 C2 discloses an automobile having an elastic trim that constitutes a front end section, on which are provided at least one cooling air opening and one lamp or lamp cluster, and in which at least one elongated fin is arranged on the at least one cooling air opening. In this arrangement, the at least one lamp or lamp cluster is provided on a flat section of the trim, separately from the cooling air openings. Separate recess-shaped receptacles, the manufacture of which adds cost to the kit, are therefore provided in order to accommodate the lamp or the lamp cluster.

It is an object of the invention to arrange a lamp or a lamp cluster on the trim in such a way that such additional cost can be avoided in the kit.

This object is attained in accordance with the invention by having the lamp or lamp cluster arranged within the at least one cooling air opening and mounted on the at least one elongated fin. Further features that configure the invention in an advantageous manner are set forth in the dependent claims.

The main advantages obtained with the invention are that, by arranging the lamp or the lamp cluster within the at least one cooling air opening and by mounting it on a fin that extends within the cooling air opening, a cost-effective attachment of the lamp or lamp cluster on the trim is achieved, since additional valves for accommodating the lamp can be omitted. Furthermore, the number of breakthroughs in the flat areas of the trim is reduced. By adapting the lamp or the lamp cluster to the cross sectional shape of the adjacent fin, the optical appearance of the trim is optimized. The lamp or lamp cluster is mounted on the trim in a simple manner by means of a socket and screw connection. Since the lamp or lamp cluster is provided toward the outside with an inwardly directed indentation, the lamp or lamp cluster appears to be arranged unsupported within the cooling air opening. The lamp or lamp cluster in the exemplary embodiment comprises a flashing light and/or a position light. LED technology allows a relatively small construction of the blinking light, with less installation depth required.

The front boundary edge of the lamp or lamp cluster seen in plan view is configured in such a way that it projects slightly relative to the contour of the adjacent trim. The first contact point of the pendulum during a 30° pendulum impact according to USA-PART 581 or CMVSS215 thereby moves inwardly, and is within the area of the lamp or lamp cluster. During a pendulum impact, the bumper mount located relatively far inward is thus struck, the function of the lamp or the lamp cluster and a main headlight is maintained in the case of a pendulum impact, and the radiator, which is arranged in the lateral external area at a distance from the trim, is not damaged by the pendulum.

An exemplary embodiment of the invention is shown in the drawings.

BRIEF DESCRIPTION OF THE DRAWINGS

FIG. 5 shows a section along line V-V of FIG. 2 in enlarged scale, and

FIG. 6 shows a section along line VI-VI of FIG. 2 in enlarged scale.

DETAILED DESCRIPTION OF THE INVENTION

Figure 1:
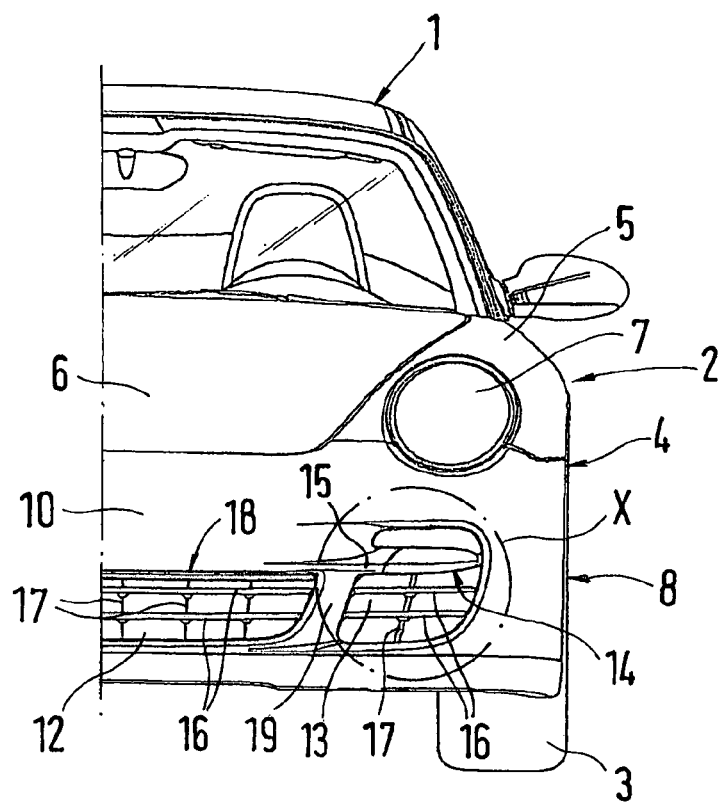
FIG. 1 shows a partial frontal view of the front end of a motor vehicle.
Figure 4:
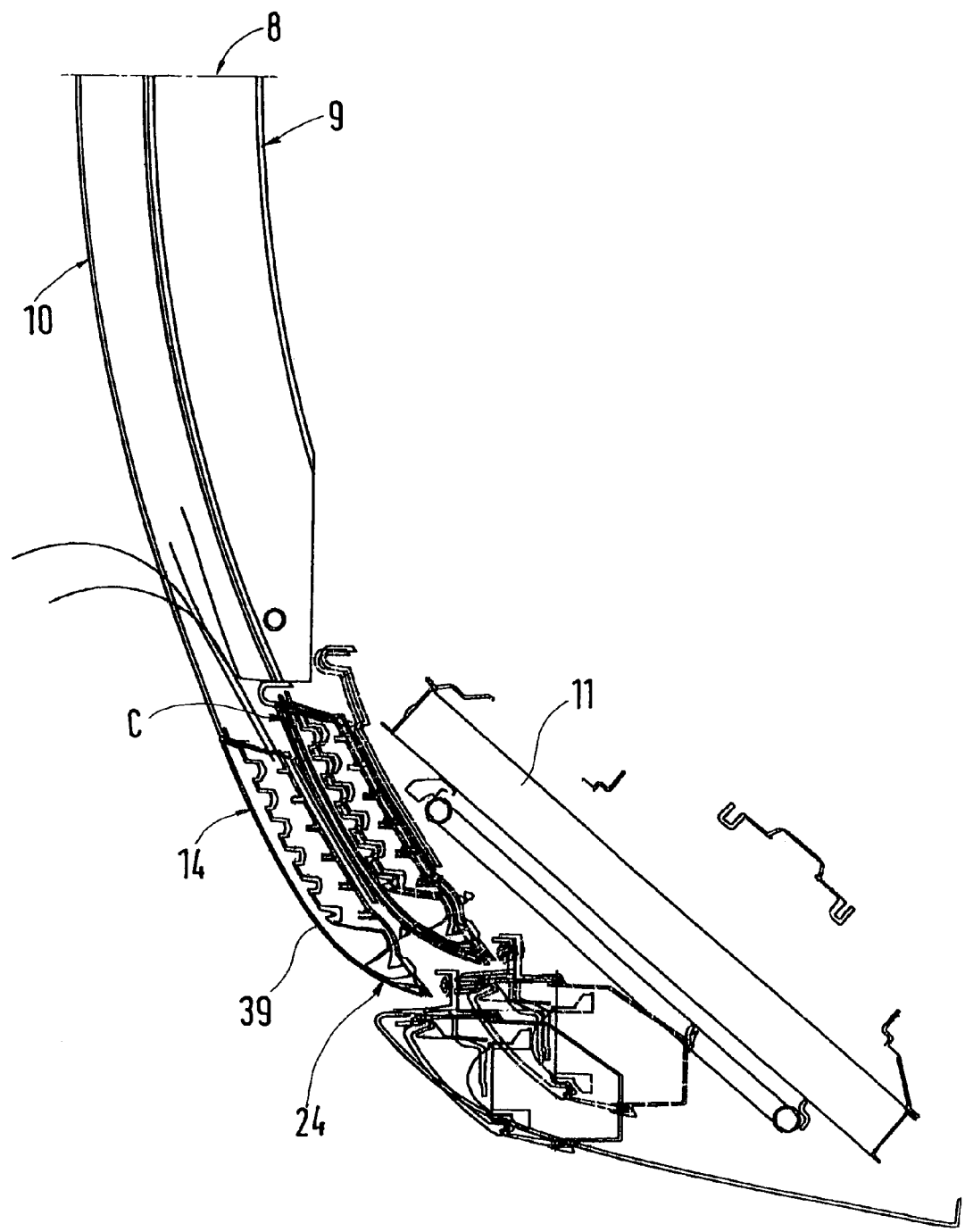
FIG. 4 shows a section along line IV-IV of FIG. 3.

The motor vehicle 1 constituted by an automobile has wheels 3 and a structure 4 in the front section 2 that is shown. The structure 4 comprises a front lateral component 5, a hood 6, a headlight 7, and a bumper 8. The bumper 8 is comprised of a transverse, inherently rigid mount 9 supported on the side of the structure and an elastic trim 10 that constitutes the end section of the structure 4. In FIG. 1 only the right half of the vehicle is shown. The left half of the vehicle is configured as a reflected image of the right half of the vehicle. Because of a lateral exterior radiator 11, which extends diagonally, the inherently rigid mount 9 ends relatively far inward (FIG. 4). The inherently rigid but elastic trim 10 has at least one cooling air opening 12, 13 and at least one lamp or lamp cluster 14, wherein at least one elongated fin 15 is provided on the at least one cooling air opening 12, 13.

In accordance with the invention, the lamp or lamp cluster 14 is provided within the at least one cooling air opening 12, 13 of the trim 10, and is mounted on a fin 15 that extends within the cooling air opening 12, 13.

According to FIG. 1, the trim 10 has a central cooling air opening 12 and lateral exterior cooling openings 13, wherein a respective lamp or lamp cluster 14 is preferably arranged within the lateral external cooling air openings 13. In the exemplary embodiment, the cooling air openings 12, 13 form air inlets for the radiator behind them.

In FIG. 1 only one lateral external cooling air opening 13 is depicted. The lamp or the lamp cluster 14 is arranged in only a partial section A of the longitudinal extension of the fin 15. The fin 15 is preferably adapted to the shape of the lamp or lamp cluster 14. In the exemplary embodiment, the fin 15 that accommodates the lamp or lamp cluster 14 extends in a transverse direction relative to the direction of travel of the motor vehicle and is aligned approximately horizontally. Several superimposed fins 15, 16 and upright fins 17, respectively, are provided at each cooling air opening 12, 13. The fins 16 have a flat web-like cross section, whereas the fin 15 seen in cross section forms a closed hollow component. The fin 15 seen in the vertical direction runs somewhat above an upper edge 18 of the central cooling air opening 12. Between the adjacent cooling air openings 12, 13 there extends a narrow upright web 19 of the trim 10 (FIG. 1).

Figure 2:
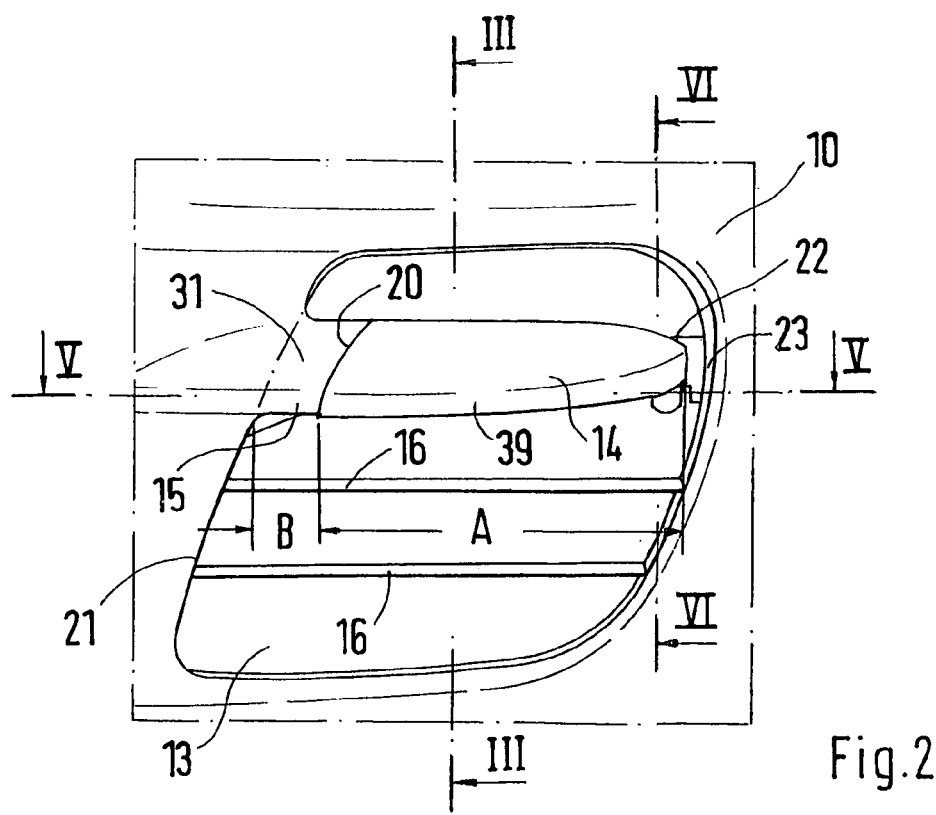
FIG. 2 shows a detail X of FIG. 1 in enlarged scale.

An internal end 20 of the lamp or lamp cluster 14 extends at a distance B relative to the adjacent lateral edge 21 of the cooling air opening 13, whereas the outer end 22 of the lamp cluster 14 is guided relatively close to the outer edge 23 of the cooling air opening 13 (FIG. 2).

The lamp or lamp cluster 14 (seen in plan view) has at its external end 22 an indentation 24, which is directed inward relative to the contour of the trim 10. In the view from the front, the lamp or lamp cluster 14 appears to be unsupported within the air inlet of the trim 10.

The elastic trim 10, made of suitable plastic or foam, consists of a single-piece outer component 25 and an inner holding frame 26, wherein the outer component 25 and the holding frame 26 are connected to one another locally via clip connections, which are not shown in more detail. The outer component 25 and the inner holding frame 26 can be configured as one or several parts.

In the exemplary embodiment, the lamp or lamp cluster 14 comprises a blinking light 27 and/or a position light 28. The blinking light 27 is preferably implemented on the basis of LED technology and comprises several LEDs arranged side by side. The LED technology requires less installation space (installation depth) than the conventional lighting technology (incandescent lamp).

Figure 3:
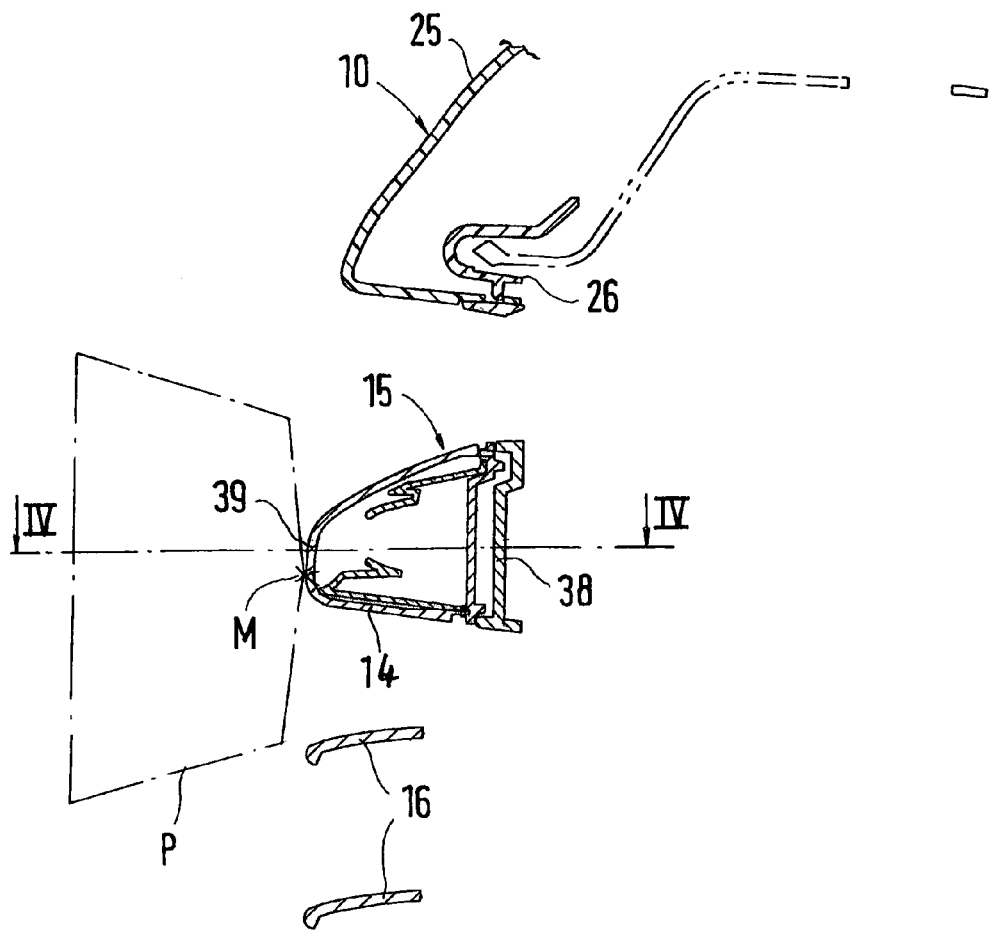
FIG. 3 shows a section along line III-III of FIG. 2 in enlarged scale.
Figure 3:
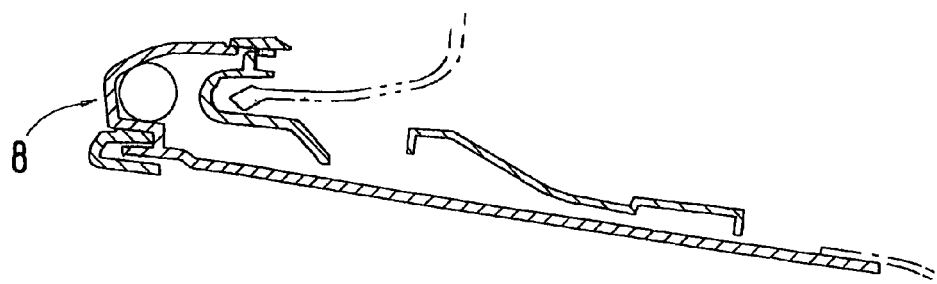

The lamp or lamp cluster 14 is mounted via a socket connection 29 and a screw connection 30 onto the trim 10 or onto the holding frame 26. The internal end 20 of the lamp or lamp cluster 14 is connected flush with the contour to the adjacent molded fin section 31 of the outer component 25. A flange 32 of the fin section located on the side of the edge projects into a corresponding receptacle 33 of the lamp or lamp cluster 14. The external end 22 of the lamp or the lamp cluster 14 is held in position via a screw connection 30 on the inner holding frame 26. According to FIG. 6, a socket nut 35, a speed nut, etc. is slid onto a stationary holding flange 34 of the inner holding frame 26 and encloses the holding flange 34 on both sides. An angular mounting web 36 of the lamp or lamp cluster 14 rests on a head section of the socket nut 35 or the speed nut, and is tightened against the holding frame 26 via a screw 37 screwed into the socket nut 35 or speed nut. The lamp or lamp cluster 14 rests locally between the two mounts 29, 30, at the end sides on an upright profiled web 38 of the inner holding frame 26 (FIG. 3). The upright web 38 has local leadthrough openings for the position light 28, a cable sheathing, and an exhaust element.

A front boundary edge 39 of the lamp or lamp cluster 14 (seen in plan view) projects slightly relative to the adjacent contour of the trim 10, whereby with a 30° pendulum impact, the first contact point M of the pendulum P moves inward into the area of the lamp or lamp cluster 14. In this way, with a 30° pendulum impact, the internal bumper mount 9 is struck, the function of the lamp or lamp cluster and of a main headlight (not shown in detail herein) is retained during a pendulum impact, and the radiator arranged in the lateral external area at a distance from the trim 10 remains undamaged by a pendulum impact. The position C of the lamp cluster 14 after a pendulum impact is shown in phantom outline.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A motor vehicle comprising:
   trim, constituting an end section of the motor vehicle, in which at least one cooling air opening forming an air inlet for a motor vehicle radiator behind the opening is provided, at least one elongated fin being arranged so as to extend within the at least one cooling air opening, and
   a lamp or lamp cluster arranged within the at least one cooling air opening and mounted on the at least one elongated fin,
   wherein the lamp or lamp cluster has an internal end connected to an adjacent section of the at least one elongated fin, and wherein the at least one elongated fin is adapted to the shape of the lamp or lamp cluster.

2. The motor vehicle of claim 1, wherein the at least one cooling air opening is one of several cooling air openings provided in the trim, and wherein the lamp or lamp cluster is arranged on laterally external openings of the several cooling air openings.

3. The motor vehicle of claim 2, wherein the at least one elongated fin extends in a transverse direction relative to a direction of travel and is aligned approximately horizontally.

4. The motor vehicle of claim 2, wherein the internal end of the lamp or lamp cluster extends at a distance relative to an adjacent lateral edge of the at least one cooling air opening, and wherein an outer end of the lamp or lamp cluster is guided relatively close to an outer edge of the cooling air opening.

5. The motor vehicle of claim 2, wherein the trim is made of an elastic plastic and is composed of an outer component and an inner holding frame comprised of at least one part, and wherein the outer component and the inner holding frame are connected to one another via a clip connection.

6. The motor vehicle of claim 2, wherein the lamp or lamp cluster comprises at least one of a blinking light and a position light.

7. The motor vehicle of claim 2, wherein the lamp or lamp cluster comprises a blinking light which is implemented on the basis of LED technology.

8. The motor vehicle of claim 1, wherein the at least one elongated fin extends in a transverse direction relative to a direction of travel and is aligned approximately horizontally.

9. The motor vehicle of claim 1, wherein the internal end of the lamp or lamp cluster extends at a distance relative to an adjacent lateral edge of the at least one cooling air opening, and wherein an outer end of the lamp or lamp cluster is guided relatively close to an outer edge of the cooling air opening.

10. The motor vehicle of claim 1, wherein the trim is made of an elastic plastic and is composed of an outer component and an inner holding frame comprised of at least one part, and wherein the outer component and the inner holding frame are connected to one another via a clip connection.

11. The motor vehicle of claim 10, wherein the lamp or lamp cluster is held in place on the trim via a socket connection and a screw connection.

12. The motor vehicle of claim 11, wherein the internal end of the lamp or lamp cluster is connected via the socket connection to the adjacent section of the at least one elongated fin.

13. The motor vehicle of claim 11, wherein the lamp or lamp cluster rests locally on an upright profiled web of the inner holding frame.

14. The motor vehicle of claim 1, wherein the lamp or lamp cluster comprises at least one of a blinking light and a position light.

15. The motor vehicle of claim 1, wherein the lamp or lamp cluster comprises a blinking light which is implemented on the basis of LED technology.

16. A motor vehicle comprising:
   trim, constituting an end section of the motor vehicle, in which at least one cooling air opening is provided, at least one elongated fin being arranged so as to extend within the at least one cooling air opening, and
   a lamp or lamp cluster arranged within the at least one cooling air opening and mounted on the at least one elongated fin,
   wherein the at least one cooling air opening is one of several cooling air openings provided in the trim, and wherein the lamp or lamp cluster is arranged on laterally external openings of the several cooling air openings, and wherein an indentation which is directed inward relative to a contour of the trim is disposed at an external end of the lamp or lamp cluster.

17. The motor vehicle of claim 16, wherein the external end of the lamp or lamp cluster is held in place on an inner holding frame via a screw connection.

18. A motor vehicle comprising:

trim, constituting an end section of the motor vehicle, in which at least one cooling air opening is provided, at least one elongated fin being arranged so as to extend within the at least one cooling air opening, and a lamp or lamp cluster arranged within the at least one cooling air opening and mounted on the at least one elongated fin, wherein a front boundary edge of the lamp or lamp cluster projects slightly relative to a contour of the trim so that, with a 30° pendulum impact, a first contact point of a pendulum is moved inward into an area of the lamp or lamp cluster.

19. A motor vehicle comprising:

trim, constituting an end section of the motor vehicle, in which at least one cooling air opening is provided, at least one elongated fin being arranged so as to extend within the at least one cooling air opening, and a lamp or lamp cluster arranged within the at least one cooling air opening and mounted on the at least one elongated fin, wherein the at least one cooling air opening is one of several cooling air openings provided in the trim, and wherein the lamp or lamp cluster is arranged on laterally external openings of the several cooling air openings, and wherein a front boundary edge of the lamp or lamp cluster, as seen in plan view, projects slightly relative to a contour of the trim so that, with a 30° pendulum impact, a first contact point of a pendulum is moved inward into an area of the lamp or lamp cluster.

* * * * *